United States Patent
Lee et al.

(10) Patent No.: US 12,035,244 B2
(45) Date of Patent: Jul. 9, 2024

(54) POWER SAVE PROTOCOL FOR LOW POWER DEVICE EXPLOITING WAKEUP SIGNAL RECEIVER

(71) Applicant: NEWRACOM, Inc., Lake Forest, CA (US)

(72) Inventors: Joonsoo Lee, Seoul (KR); Junyoun Won, Irvine, CA (US); Hyun Sik Jung, Seoul (KR); Hyungu Park, Irvine, CA (US)

(73) Assignees: NEWRACOM, Inc., Irvine, CA (US); NEWRATEK, Inc., Seoul (KR)

( * ) Notice: Subject to any disclaimer, the term of this patent is extended or adjusted under 35 U.S.C. 154(b) by 135 days.

(21) Appl. No.: 17/807,368

(22) Filed: Jun. 16, 2022

(65) Prior Publication Data

US 2022/0408362 A1  Dec. 22, 2022

Related U.S. Application Data

(60) Provisional application No. 63/211,438, filed on Jun. 16, 2021.

(51) Int. Cl.
*H04W 52/02* (2009.01)
*H04L 49/90* (2022.01)
*H04L 69/22* (2022.01)

(52) U.S. Cl.
CPC ..... *H04W 52/0235* (2013.01); *H04L 49/9042* (2013.01); *H04L 69/22* (2013.01); *H04W 52/0229* (2013.01); *H04W 52/0274* (2013.01)

(58) Field of Classification Search
CPC ............... H04L 69/22; H04L 49/9042; H04W 52/0235; H04W 52/0229; H04W 52/0274
See application file for complete search history.

(56) References Cited

U.S. PATENT DOCUMENTS

| | | | |
|---|---|---|---|
| 11,483,771 B2* | 10/2022 | Park | H04L 27/26134 |
| 11,483,857 B2* | 10/2022 | Atefi | H04W 52/0235 |
| 11,576,123 B2* | 2/2023 | Kristem | H04L 27/2613 |
| 11,689,336 B2* | 6/2023 | Chitrakar | H04L 27/2613 370/336 |
| 2023/0148178 A1* | 5/2023 | Chitrakar | H04W 52/0216 713/170 |

OTHER PUBLICATIONS

Deng et al, "IEEE 802.11ba: Low-Power Wake-Up Radio for Green IoT", IEEE 2019 (Year: 2019).*

(Continued)

*Primary Examiner* — Omer S Mian
(74) *Attorney, Agent, or Firm* — Nicholson, De Vos, Webster & Elliott, LLP

(57) ABSTRACT

A method performed by a wireless device for wirelessly transmitting a wake-up signal. The method includes wirelessly transmitting a legacy physical layer protocol data unit (PPDU) to protect a wake-up receiver PPDU, wherein the legacy PPDU includes a preamble and a legacy frame, wherein the legacy frame includes a power management field that indicates that the wireless device is transitioning to a doze state to cause other wireless devices to refrain from transmitting to the wireless device and wirelessly transmitting a wake-up receiver PPDU after transmitting the legacy PPDU.

20 Claims, 16 Drawing Sheets

(56) References Cited

OTHER PUBLICATIONS

Bankov et al, "IEEE 802.11ba—Extremely Low Power Wi-Fi for Massive Internet of Things—Challenges, Open Issues, Performance Evaluation" IEEE 2019 (Year: 2019).*

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.

IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunicationsand information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE_802_11ba-2021, "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications, Amendment 3: Wake-Up Radio Operation, Mar. 25, 2021, 180 pages.

IEEE_802_11p-2010, "IEEE Standard for Information technology—Telecommuications and information exchange between systems—Local and metropolitan area networks—Specific Requirments", Part 11: Wireless LAN Medium Access Control (MAC) and Physical Layer (PHY) Specifications, Amendment 6: Wireless Access in Vehicular Environments, Jul. 15, 2010, 51 pages.

* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

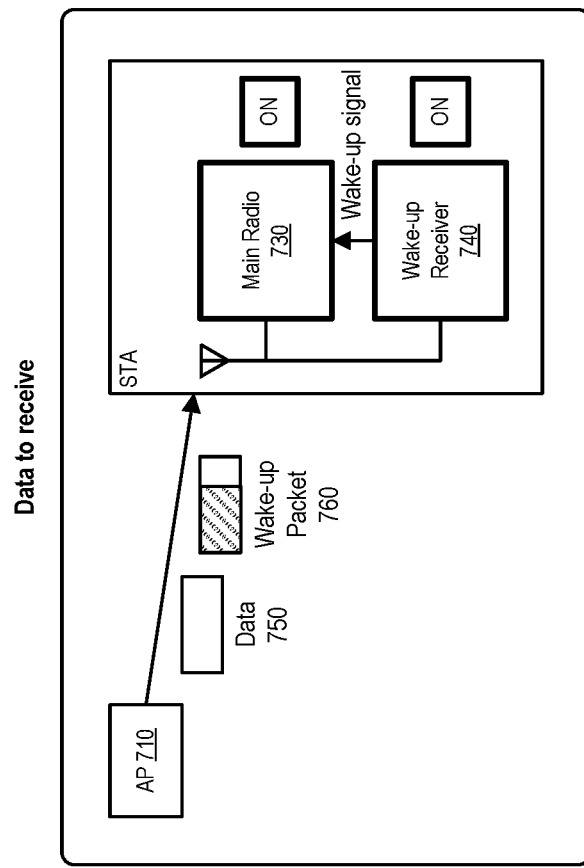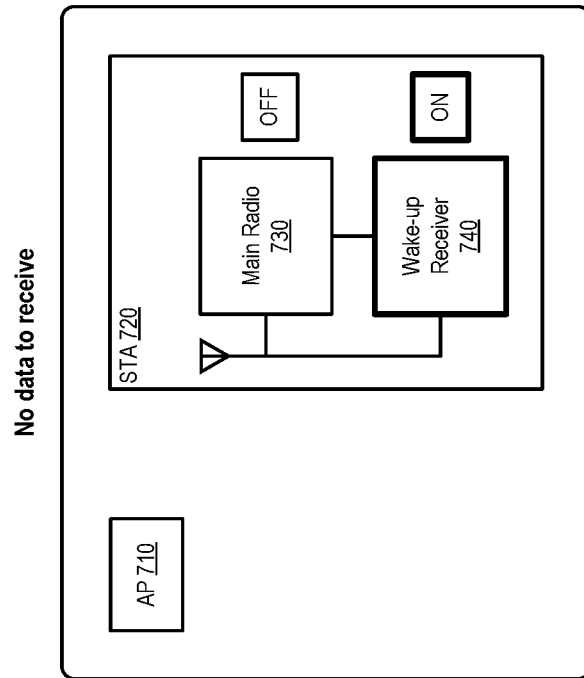
FIG. 7

← 1500

```
┌─────────────────────────────────────────────────────────────────────────┐
│  Wirelessly transmit a legacy physical layer protocol data unit (PPDU) to protect a wake-up │
│  receiver PPDU, wherein the legacy PPDU includes a preamble and a legacy frame, wherein the │
│  legacy frame includes a power management field that indicates that the wireless device is │
│  transitioning to a doze state to cause other wireless devices to refrain from transmitting to the │
│                            wireless device 1502                          │
│  ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│  │  Wirelessly transmit a service field after transmitting the preamble but before │ │
│  │ transmitting the legacy frame, wherein the service field indicates that transmission of│ │
│  │                the wake-up receiver PPDU is forthcoming                 │ │
│  │                                 1504                                    │ │
│  └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────────┘
                                     ↓
┌─────────────────────────────────────────────────────────────────────────┐
│     Wirelessly transmit the wake-up receiver PPDU after transmitting the legacy PPDU    │
│                                 1506                                     │
└─────────────────────────────────────────────────────────────────────────┘
                                     ↓
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Wirelessly transmit a data frame after a transition delay has elapsed since the wake-up receiver │
│ PPDU was transmitted, wherein the data frame includes a power management field that indicates │
│ that the wireless device has transitioned to an awake state to allow the other wireless devices to │
│                       transmit to the wireless device                    │
│                                 1508                                     │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 15

POWER SAVE PROTOCOL FOR LOW POWER DEVICE EXPLOITING WAKEUP SIGNAL RECEIVER

CROSS-REFERENCE TO RELATED APPLICATION

This application claims the benefit of U.S. Provisional Application No. 63/211,438, filed Jun. 16, 2021, which is hereby incorporated by reference.

TECHNICAL FIELD

The present disclosure generally relates to wireless communications, and more specifically, relates to reducing power consumption in a wireless network using a wake-up receiver.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

The IEEE 802.11ah standard offers various low power features. However, they are not adequate in some application that require ultra-low power consumption as well as low latency time at the same time during the power save mode.

In some wireless communication systems, when a wireless device does not have any data to transmit or receive, the wireless device may enter a doze state to save power. Also, the wireless device may set a duty cycle to periodically wake up from the doze state to check whether data transmission or reception is required. The wireless device can save more power by staying in the doze state longer but this increases the probability that the wireless device does not receive data intended for itself. To address this tradeoff, the concept of wake-up receiver (also referred to as "WUR") has been introduced in recent wireless communications systems.

A wake-up receiver may operate as a discrete module or unit that is separate from the main radio. Alternatively, the wake-up receiver may be implemented as a part of the main radio. Assuming that communications between the main radios of wireless devices are required, if the wake-up receiver of a wireless device receives a specific wireless signal from another wireless device (sometimes referred to as a "wake-up signal"), the wake-up receiver may play a role in transitioning the main radio of the wireless device from a doze/sleep state to an awake state. Since the main radio consumes more power, it may stay in the doze state most of the time to reduce power consumption. The wake-up receiver may cause the main radio to wake up from the doze state only when data transmission or reception by the main radio is required. As a result, power consumption of the wireless device can be significantly reduced compared to other power save protocols. When such a wake-up receiver is used, it is not necessary to periodically wake up the entire main radio to check whether there is valid data to receive or transmit. Instead, the wake-up receiver, which consumes comparatively less power than the main radio, may listen for a signal indicating that the wireless device should wake up. The wake-up receiver may periodically transition to the doze state rather than always being in a state that can accept reception, so that even the power consumed by the wake-up receiver itself can be reduced. As a result, the power consumption of the entire system can be reduced.

A delay time is inevitably required for a wireless device to wake up its main radio. If an access point (AP) transmits a wake-up signal to a first STA equipped with a wake-up receiver but a second STA begins to transmit while the AP waits for the first STA to wake up its main radio, the AP's transmission of data to the first STA may be delayed, resulting in increased latency.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 7 is a diagram showing operational examples of a low-power wake-up receiver when there is data to receive and when there is no data to receive, according to some embodiments.

FIG. 15 is a diagram showing a method for wirelessly transmitting a wake-up signal, according to some embodiments.

DETAILED DESCRIPTION

Figure 1:
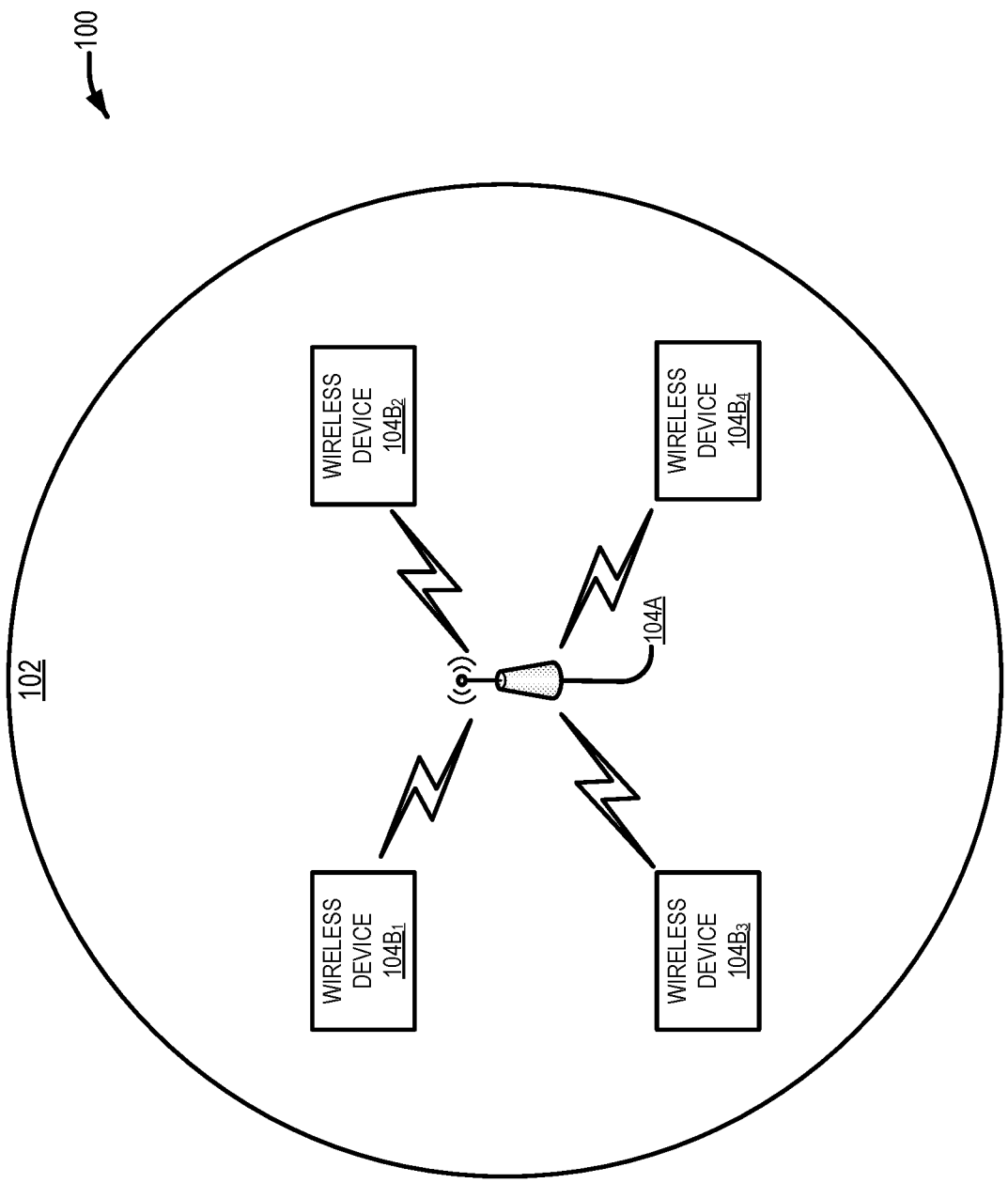
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to reducing power consumption and increasing channel usage efficiency in a wireless network using a wake-up receiver.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B1-104B4 that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B1-104B4) may be collectively referred to as STAs. However, for ease of description, only the non-AP STAs may be referred to as STAs. Although shown with four non-AP STAs (e.g., the wireless devices 104B1-104B4), the WLAN 100 may include any number of non-AP STAs (e.g., one or more wireless devices 104B).

Figure 2:
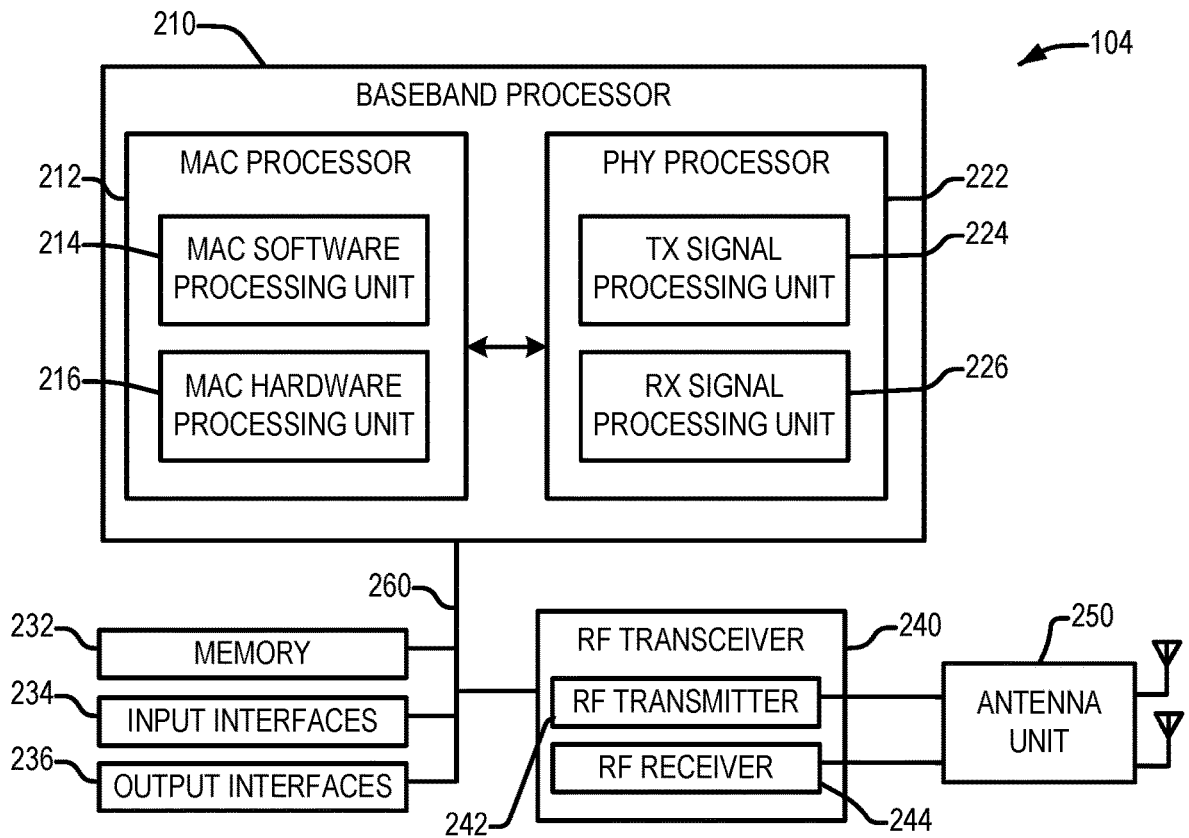
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B1-104B4 in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
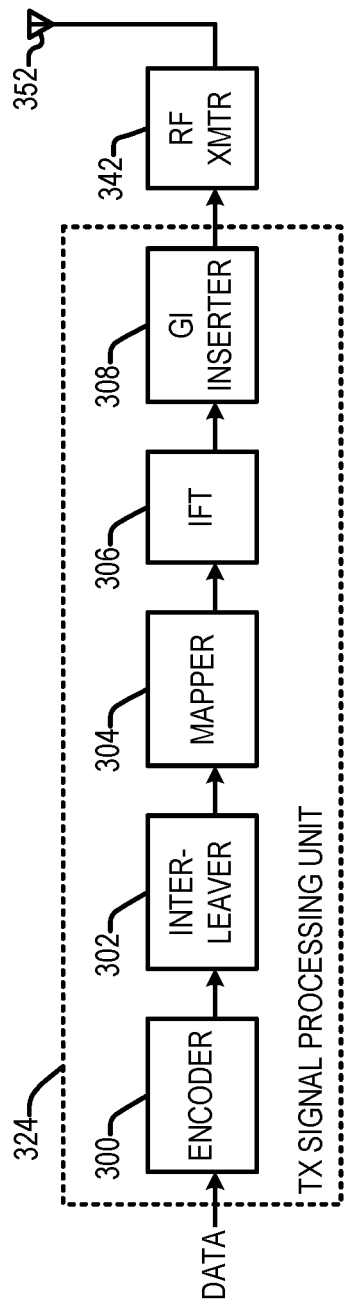
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
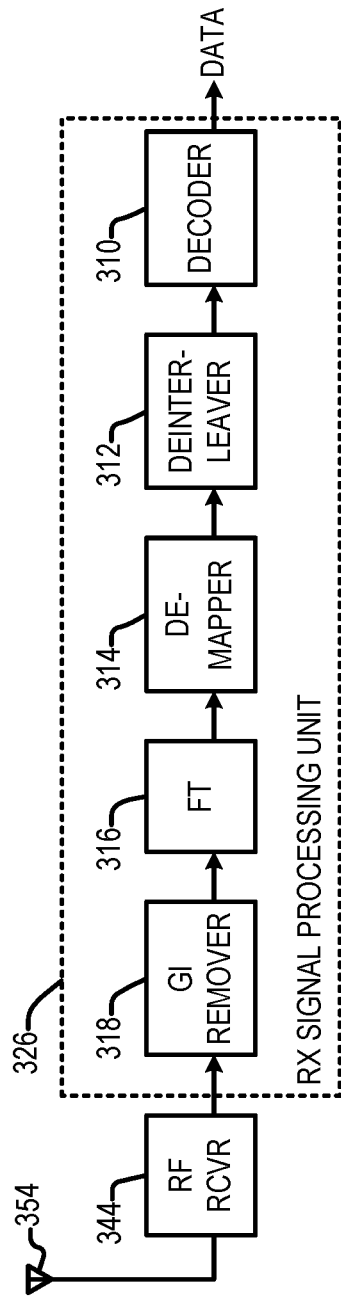
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MC S) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
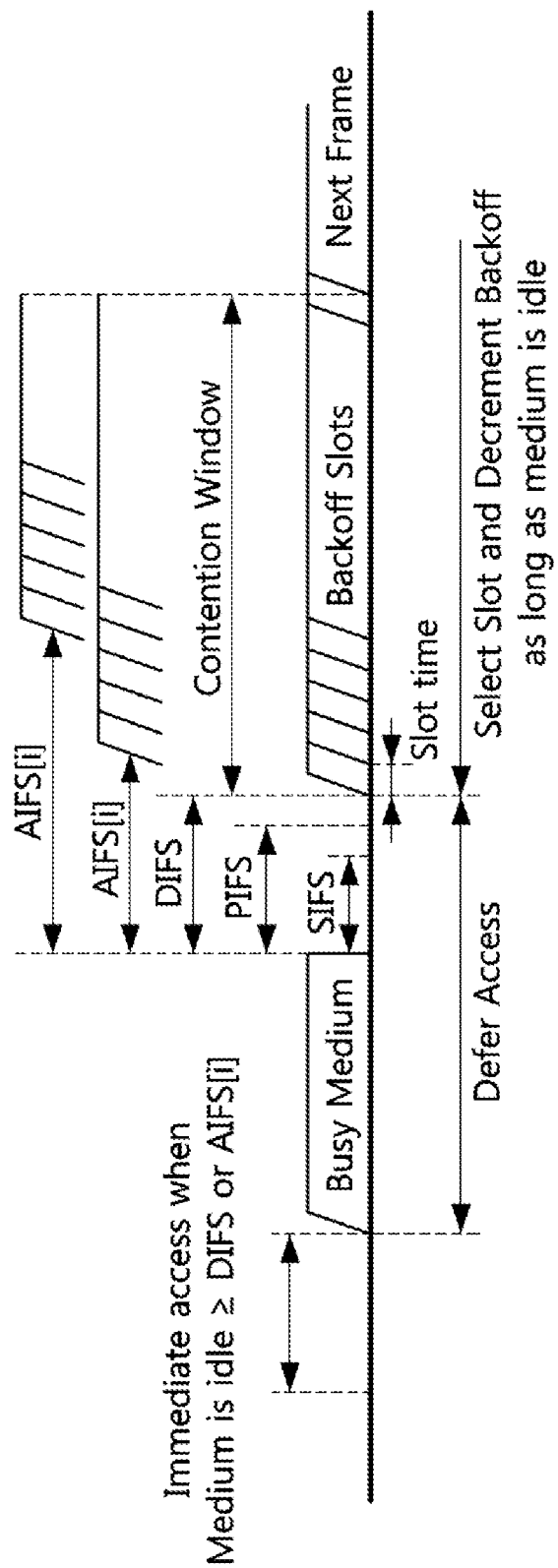
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
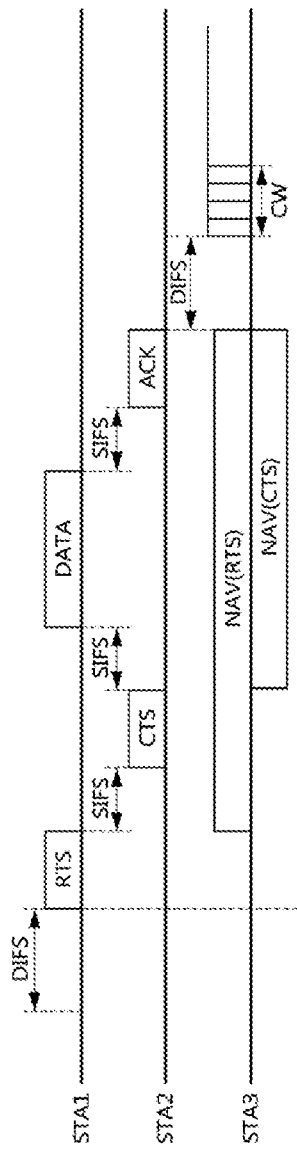
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

In this concept, the main radio (e.g., IEEE 802.11ah) is used for user data transmission and reception. The main radio is turned off unless there is data for it to transmit or receive. The wake-up receiver wakes up the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves as a "wake-up" receiver for the main radio. For this purpose, the wake-up receiver may be a relatively simple receiver. Also, the wake-up receiver may be active while the main radio is turned off. The design of the wake-up receiver may be simple such that its target power consumption is much lower than that of the main radio (e.g., the target power consumption may be less than 100 uW when active). To achieve this goal, the wake-up receiver may use simple modulation schemes such as OOK with repetition (or spreading) schemes instead of complicated modulation schemes that require coherent detection and channel coding schemes.

FIG. 7 is a diagram showing operational examples of a low-power wake-up receiver when there is data to receive and when there is no data to receive, according to some embodiments. As shown in the diagram, when there is no data to receive, the wake-up receiver 740 of the STA 720 is active (it is turned "ON") while the main radio 730 (e.g., an 802.11ah radio) of the STA 720 is turned off (it is turned "OFF") or in a low-power state. This is an example where the STA 720 is in a power-save mode to reduce power consumption. However, when the AP 710 has data 750 to send to the STA 720, the AP may first send a wake-up signal in the form of a wake-up packet (WUP) 760 which is transmitted using a new waveform such as OOK. The wake-up receiver 740 of the STA 720 may receive this wake-up packet 760. Responsive to receiving this wake-up packet 760, the wake-up receiver 740 of the STA 720 may wake up the main radio 730 of the STA 720 (turn the main radio 730 on) so that the main radio 730 becomes active. After the main radio 730 of the STA is active, the AP may send data 750 to the STA (e.g., using 802.11ah), which is received by the main radio 730 of the STA 720. The STA 720 is said to be in an active mode when its main radio 730 is active.

Embodiments are described herein leverage an AP power save protocol (e.g., the power save protocol defined in the 802.11ah specification) to prevent legacy STAs from transmitting while an AP is waiting for a STA to wake up its main radio after having sent a wake-up signal to the STA. Also, embodiments described herein provide a way for a STA equipped with a wake-up receiver to recognize the existence of a wake-up signal to prevent the STA from unintentionally transitioning to a doze state due to the use of the AP power save protocol mentioned above.

In some WLAN systems, when there is no data to exchange between an AP and a STA, the STA that supports power save mode transitions to a doze state to reduce power consumption of the STA. The STA may periodically transition to an awake state to check whether there is a packet to be received according to a beacon listen interval that was agreed upon when the STA established a connection with the AP. The STA may transition to the awake state at the time the AP is expected to transmit a beacon frame. A considerable amount of time and power is consumed until the STA transitions to the awake state. As mentioned above, the concept of a wake-up receiver has been introduced as a solution to reduce the power consumption of a STA that requires low-power operation. The STA may use its wake-up receiver to determine whether it needs to wake up without having to activate the entire wireless system (e.g., without having to activate its main radio).

According to the existing standardized power save protocol, a wireless device is said to be in an "awake state" when its main radio is turned on and is said to be in a "doze state" if its main radio is turned off. The wake-up receiver of the wireless device may still operate when the main radio is in the doze state. A state in which the wake-up receiver is turned on is referred to as a "WUR awake state" and a state in which the wake-up receiver is turned off is referred to as a "WUR doze state."

A main wireless communication system may be divided into a RF/baseband component, which manages wireless communications, and a CPU and program component that operates by loading code for execution on the CPU. It takes some time to activate the RF/baseband from the doze state to the awake state, and it also takes some time to load and prepare the program in memory for execution by the CPU (e.g., to load protocol of certain wireless specification, essential component of entire system operation, network stack, etc.). All operations that are needed to prepare the program may be referred to herein as "bootup". In order for the wireless communication system to perform transmission/reception operations normally, all of these preparation steps should be completed.

A wake-up receiver may be implemented in, connected to, or attached to a wireless device that needs to perform low-power operations. The wireless device that transmits a signal that can be received by a wake-up receiver may be a wireless device that performs low-power operation, but is typically an AP STA or other type of base station that does not require low-power operation. An AP STA may transmit a wake-up signal unilaterally to a low-power STA equipped with a wake-up receiver.

An AP may build a BSS for data exchange with STAs that have established an association therewith. A STA existing within the same BSS as the AP is referred to herein as a "MYBSS STA" and a STA existing within another BSS is referred to herein as an "OBSS STA."

The concept of a wireless device equipped with a wake-up receiver has been introduced to support low-power operations. The wake-up receiver is a component/unit that may operate independently from the main radio, and plays the role of waking up the main radio upon receiving a wake-up signal from another wireless device. The wake-up signal is a signal that the main radio, which uses OFDM signaling, cannot interpret, and may be transmitted using a MC-OOK (multi-carrier on off keying) transmission scheme or similar transmission scheme. A legacy wireless device that is not equipped with a wake-up receiver may not be able to properly interpret the MC-OOK-modulated wake-up signal. In order to solve this backwards compatibility problem, a legacy preamble or both a legacy preamble and a legacy PSDU may be added in front of a wake-up receiver PPDU, and used as the wake-up signal.

Various features and formats are described herein in the context of 802.11 standards using terminology of 802.11 standards. Certain details (e.g., the details of certain fields/subfields and their purpose) that are not necessary to the understanding of embodiments are omitted herein for sake of conciseness and to avoid obscuring the description. Also, various embodiments are described herein in the context of S1G wireless devices operating based on the 802.11ah specification. It should be understood, however, that embodiments are not so limited. The techniques described herein may be applied to different contexts.

Figure 8:
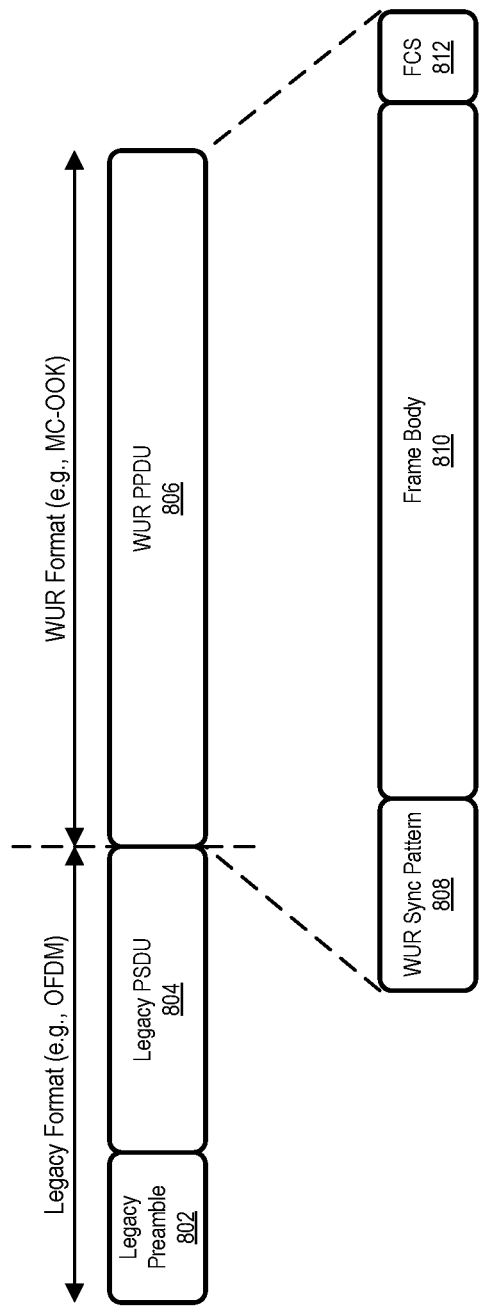
FIG. 8 is a diagram showing a format of a wake-up signal, according to some embodiments.

FIG. 8 is a diagram showing a format of a wake-up signal, according to some embodiments. As shown in the diagram, the wake-up signal includes a legacy preamble 802, a legacy PSDU 804, and a wake-up receiver PPDU 806. The legacy preamble 802 and the legacy PSDU 804 may be transmitted using a legacy transmission scheme such as an OFDM transmission scheme while the wake-up receiver PPDU 806 may be transmitted using a simpler transmission scheme such as a MC-OOK transmission scheme. Also, as shown in the diagram, the wake-up receiver PPDU 806 includes a wake-up receiver sync pattern field 808, a frame body field 810, and a frame check sequence field 812.

A legacy STA (e.g., a S1G STA that is not equipped with a wake-up receiver) that has received a wake-up signal that includes a legacy format portion can properly interpret the legacy preamble 802. The legacy STA overhearing the wake-up signal may perform protection (e.g., defer channel access) during the time in which the wake-up signal is transmitted based on information included in the SIGNAL field of the legacy preamble 802. Additionally or alternatively, it is possible to perform the protection during the corresponding time based on MAC duration information obtained from the legacy PSDU 804. In an embodiment, the wake-up receiver PPDU 806 is protected using a duration field extracted from the MPDU included in the legacy PSDU 804.

Figure 9:
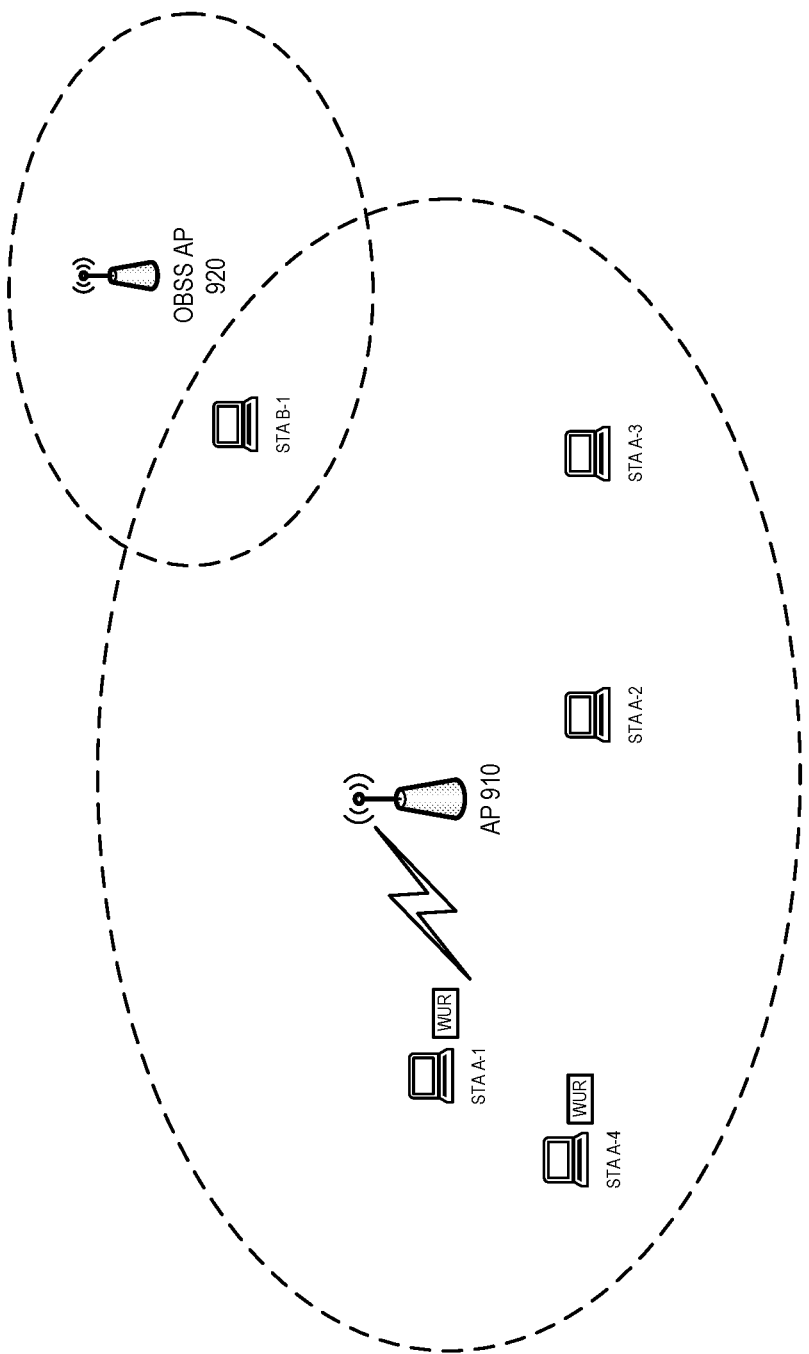
FIG. 9 is a diagram showing an example network topology, according to some embodiments.

FIG. 9 is a diagram showing an example network topology, according to some embodiments. As shown in the diagram, the network topology includes an AP 910, OBSS AP 920, STA A-1, STA A-2, STA A-3, STA A-4, and STA B-1. Legacy STAs and STAs equipped with wake-up receivers may co-exist within the same BSS. For example, in the example shown in the diagram, STA A-1 and STA A-4 are STAs are equipped with wake-up receivers, while STA A-2 and STA A-3 are legacy STAs. STA B-1 is a STA associated with an OBSS AP. Some embodiments are illustrated herein in a situation where the AP 910 transmits a wake-up signal that includes a legacy portion to STA A-1.

Figure 10:
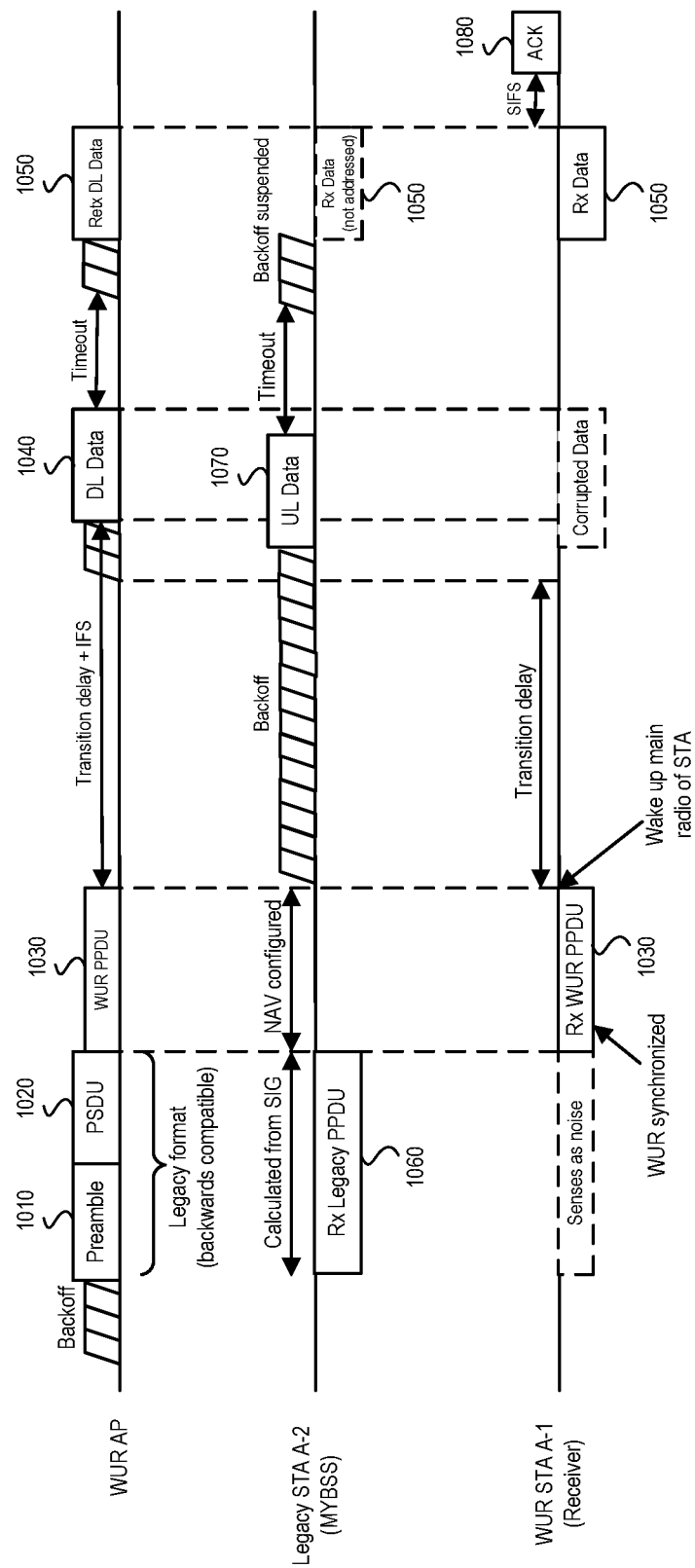
FIG. 10 is a diagram showing a frame exchange sequence between an AP and a STA equipped with a wake-up receiver, according to some embodiments.

FIG. 10 is a diagram showing a frame exchange sequence between an AP and a STA equipped with a wake-up receiver, according to some embodiments. As shown in the diagram, after completing a backoff procedure, an AP transmits a legacy preamble 1010, a legacy PSDU 1020, and a wake-up receiver PPDU 1030 to STA A-1, which is a STA equipped with a wake-up receiver. STA A-2, which is a legacy STA (that is not equipped with a wake-up receiver) in the same BSS, normally receives the legacy PSDU 1020, checks a duration field included in the PSDU 1020, and sets a NAV corresponding to the transmission duration of the wake-up receiver PPDU 1030. Since the main radio of STA A-1 is in a doze state and the wake-up receiver of STA A-1 is in an awake state, the wake-up receiver senses the legacy format portion of the signal as noise but properly receives the wake-up receiver PPDU 1030. After receiving the wake-up receiver PPDU 1030, STA A-1 recognizes that the received signal is a wake-up signal to wake up itself and thus wakes up its main radio (also referred to as a primary connectivity radio (PCR)). Waking up the main radio requires activating/stabilizing RF and/or baseband components and running MAC protocol and/or program, which takes some time. The time required for this waking up process is referred to herein as a "transition delay." After the transition delay has elapsed, the main radio of the STA A-1 enters a complete awake state and can transmit and receive data. The AP may not transmit a downlink data frame to STA A-1 until the transition delay has elapsed. A longer transition delay causes longer data latency. Also, if an AP or STA having a buffered unit in MYBSS or OBSS begins transmission during the transition delay, the downlink data transmission of the MYBSS AP may be further delayed. That is, a delay time until the target STA, which wakes up after receiving a wake-up signal from the AP, receives valid data increases. This reduces the benefits obtained from using a power save protocol. For example, in the example shown in the diagram, STA A-2, which is a legacy STA, completes a backoff process and attempts to transmit a uplink data frame 1070 at around the same time that the AP transmits a downlink data frame 1040 to STA A-1 (after a transition delay and IFS time have elapsed). At this time, the uplink data frame 1070 transmitted by STA A-2 to the AP and the downlink data frame 1040 transmitted by the AP to STA A-1 may collide with each other (such that STA A-1 receives corrupted data). The AP and/or STA A-2 may attempt to retransmit after a timeout period because there is no response. In the example shown in the diagram, after a timeout period, the AP finishes the backoff procedure, gets a chance for channel access, and retransmits a downlink data frame 1050 to STA A-1. STA A-1 receives this downlink data frame 1050 and transmits an acknowledgement frame 1080 to the AP after SIFS time.

Due to the transmission attempt by STA A-2 performed during this process, the channel usage efficiency and the power savings of STA A-1 are reduced. One solution to solve this problem is to block channel access of all wireless devices by applying a NAV for the entire transition delay. However, such solution would block channel accesses even for OBSS devices irrelevant to MYBSS. Thus, such solution cannot be considered as an effective solution since other wireless devices are forced to sacrifice channel resources in order to facilitate the transmission.

Embodiments solve this problem by using a power save feature of the AP to restrict transmission in a BSS. Embodiments may help increase channel efficiency and decrease data latency. As will be described in additional detail herein, embodiments achieve this by making use of the legacy format portion that is prefixed to the wake-up receiver PPDU.

Figure 11:
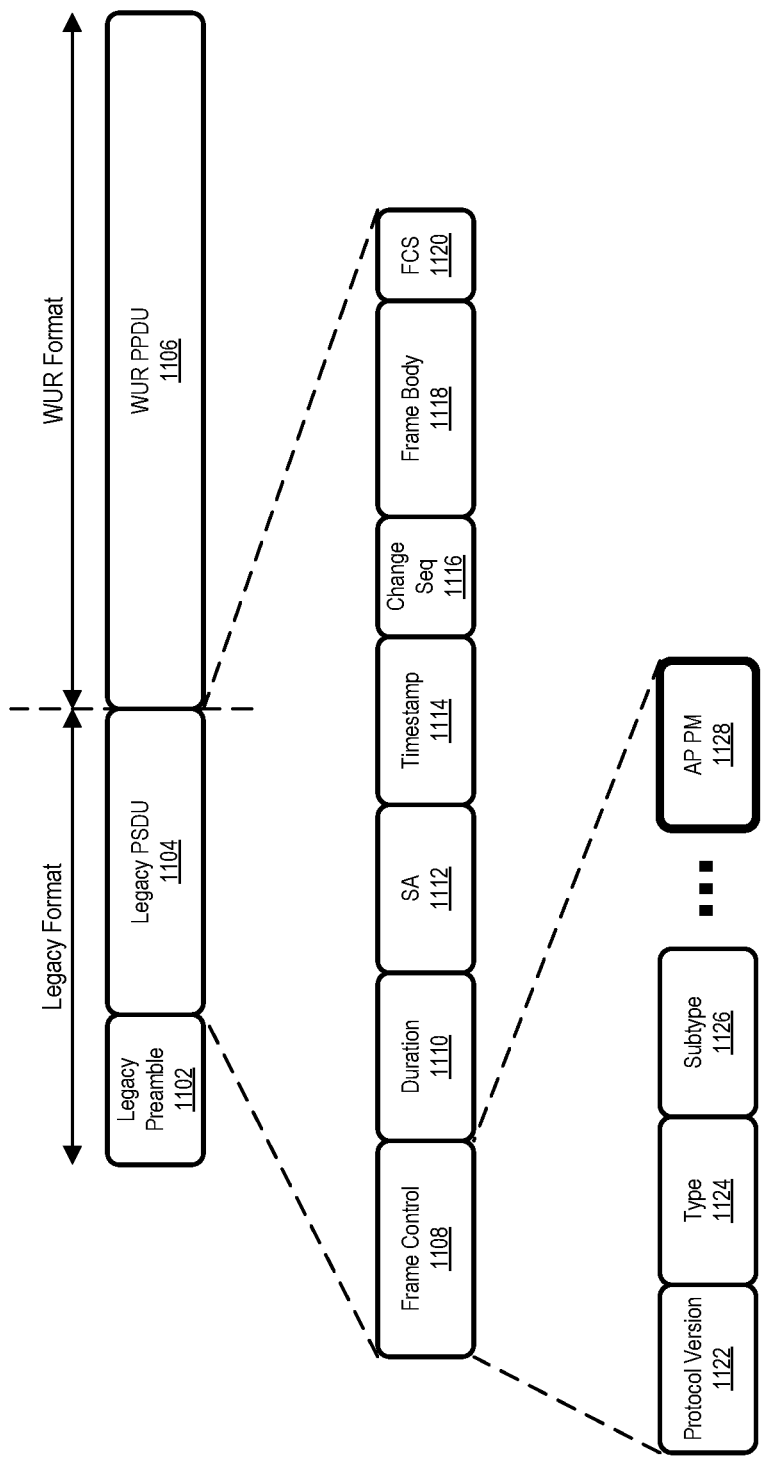
FIG. 11 is a diagram showing a format of wake-up signal that includes a legacy format portion, according to some embodiments.

FIG. 11 is a diagram showing a format of wake-up signal that includes a legacy format portion, according to some embodiments. As shown in the diagram, the wake-up signal includes a legacy preamble 1102, a legacy PSDU 1104, and a wake-up receiver PPDU 1106. In this example, the legacy PSDU 1104 is a S1G beacon frame is used as the legacy PSDU 1104. The legacy PSDU 1104 includes a frame control field 1108, a duration field 1110, a SA field 1112, a timestamp field 1114, a change seq field 1116, a frame body field 1118, and a FCS field 1120. The frame control field 1108 includes a protocol version field 1122, a type field 1124, a subtype field 1126, and an AP PM (power management) field 1128. The legacy preamble 1102 and the legacy PSDU 1104 may form a legacy portion of the wake-up signal.

In an embodiment, the AP PM field 1128 is used to indicate when the AP is entering power save mode (e.g., transitioning to the doze state) or when the AP is leaving power save mode (e.g., transitioning to an awake state). In an embodiment the AP PM field 1128 includes a single bit. In an embodiment, if this bit is set to binary '1', associated STAs may recognize that the AP is entering the power save mode and enter the power save mode themselves or otherwise do not generate/transmit uplink traffic to the AP.

Figure 12:
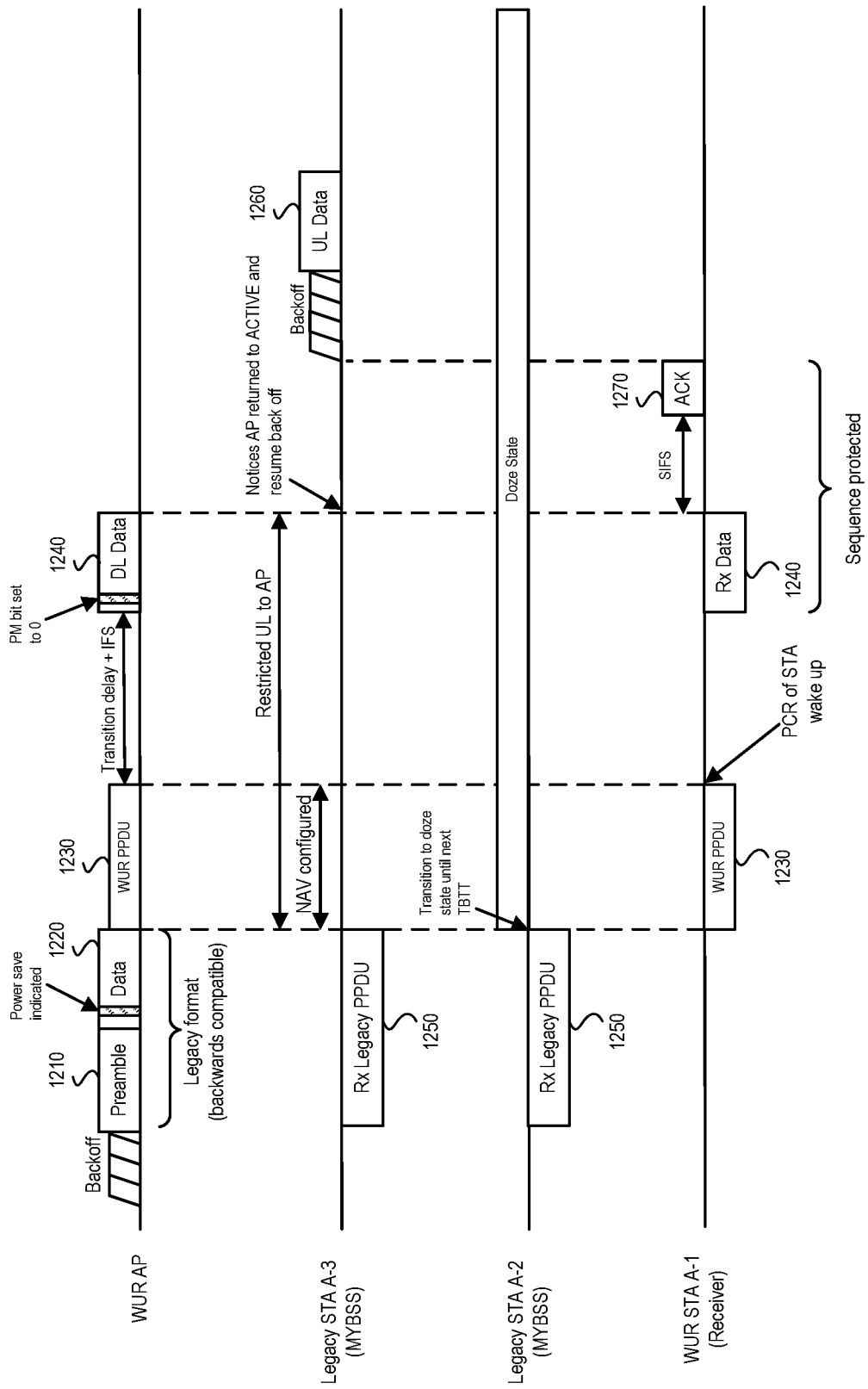
FIG. 12 is a diagram showing a frame exchange sequence leveraging an AP power save feature, according to some embodiments.

FIG. 12 is a diagram showing a frame exchange sequence leveraging an AP power save feature, according to some embodiments. As shown in the diagram, after completing a backoff procedure, an AP transmits a wake-up signal to STA A-1, where the wake-up signal includes a legacy preamble 1210, a data frame 1220 (as part of a legacy PSDU), and a wake-up receiver PPDU 1230. As shown in the diagram, the AP may set the power management bit in the legacy PSDU portion of the wake-up signal to binary '1' to indicate that the AP is transitioning to a doze state (power save is indicated).

Legacy STAs that exist in the same BSS and that receive such a wake-up signal from the AP may operate in two different ways, which are exemplified in the diagram by legacy STA A-2 and legacy STA A-3, respectively.

Upon receiving the legacy PSDU 1220 with the AP PM bit set to binary '1', (legacy) STA A-2 determines that the AP is in entering a power save mode, and thus transitions to a doze state to save power. In contrast, although the AP is in entering the power save mode, (legacy) STA A-3 may not transition to a doze state but remain in an awake state. In this case, since a NAV is set for the transmission duration of the wake-up receiver PPDU 1230 and the AP indicated that it is entering the power save mode, STA A-3 does not transmit uplink data to the AP. As a result, transmissions by other STAs in the BSS are blocked during the transition delay. It should be noted that setting the AP PM bit does not block the transmission of uplink data by STA B-1 since STA B-1 is an OBSS STA. STA A-1 normally receives the wake-up receiver PPDU 1230 and its main radio transitions to the awake state after the transition delay has elapsed. Then, the AP transmits a downlink data frame 1240 to STA A-1. In an embodiment, to inform the BSS of being in the awake state of the PS mode, the AP transmits the downlink data frame 1240 with the AP PM bit set to binary '0'. Upon successfully receiving the downlink data frame 1240, STA A-1 responds by transmitting an acknowledgement frame 1270 to the AP. STA A-3 may recognize that the AP is transitioning to an awake state by identifying that the AP PM bit in the downlink data frame 1240 is set to binary '0'. Thus, STA A-3, which had a buffered unit to the AP, may enter a state in which it can transmit an uplink data frame 1260 to the AP.

By leveraging the AP power save protocol provided in the 802.11ah standard, it is possible to avoid a situation in which MYBSS legacy STAs spoil the frame exchange sequence between a WUR AP and a WUR STA. This helps reduce power consumption of the low-power STA and avoids channel efficiency deterioration.

However, if the WUR STA is in an awake state (the main radio is on), it may not be able to properly interpret the wake-up signal transmitted by the WUR AP because the main radio of the WUR STA will only interpret the legacy portion of the wake-up signal and may unintentionally transition to the doze state based on identifying the AP PM bit being set to binary '1'.

Figure 13:
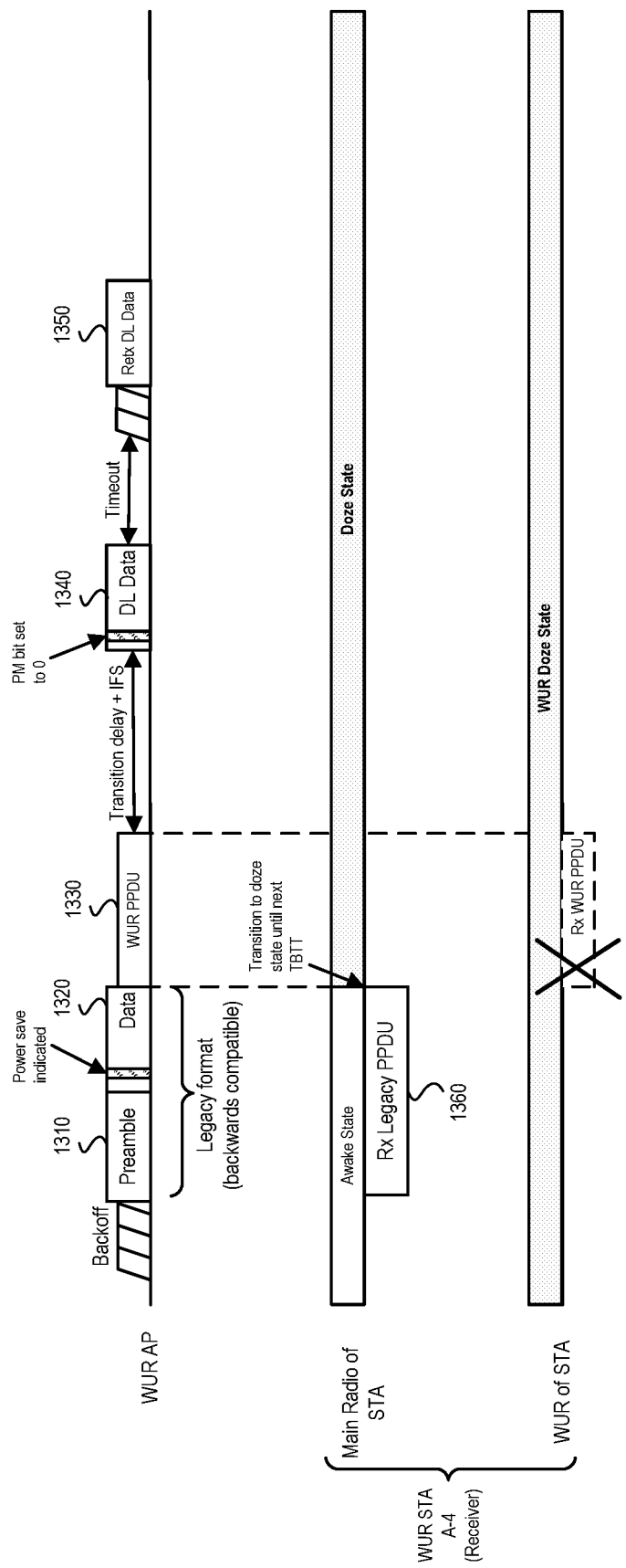
FIG. 13 is a diagram showing a frame exchange sequence where a STA misses a wake-up signal, according to some embodiments.

FIG. 13 is a diagram showing a frame exchange sequence where a STA misses a wake-up signal, according to some embodiments. The operations of the main radio and the wake-up receiver of WUR STA A-4 are shown in the diagram, where WUR STA A-4 is the addressed receiver of a wake-up signal. It is assumed that, for some reason, the main radio of STA A-4 did not transition to the doze state but stayed on the channel in an awake state. Upon reaching a service period for STA A-4 and after completing a backoff procedure, the WUR AP transmits a wake-up signal to STA A-4, wherein the wake-up signal includes a legacy preamble 1310 and a data frame prepended to a wake-up receiver PPDU 1330, in which the AP PM bit is set to binary '1'. Since only the main radio of STA A-4 is turned on (the wake-up receiver of STA A-4 is in a doze state), STA A-4 can only receive the legacy format portion of the wake-up signal. STA A-4 cannot receive the wake-up receiver PPDU 1330 because the wake-up receiver of STA A-4 is in a doze state. Upon identifying the PM bit being set to binary '1', STA A-4 assumes that the AP is transitioning to a doze state to save power. As such, STA A-4 also transitions to the doze state. After waiting for a transition delay (and an IFS time), the AP may transmit a downlink data frame 1340 to STA A-4 thinking that it is awake but the AP will not receive a response from STA A-4 since the main radio of STA A-4 is in a doze state. The AP may then try to retransmit a downlink data frame 1350.

The above-described situation is an exceptional situation that can deteriorate the protocol efficiency. In an embodiment, to prevent such a situation from occurring, an AP transmitting a wake-up signal provides an indication therein that allows a STA equipped with a wake-up receiver to be able to recognize that the signal is a wake-up signal even if the STA is only able to interpret the legacy format portion of the wake-up signal. Since most of the legacy format portion is predetermined in the specification, changing the definition of this portion should be minimized/avoided and a reserved field/bit should be used. Currently, since the SIGNAL field is a field that has a significant impact on operations of the baseband, it is difficult to use a reserved bit in the SIGNAL field. Embodiments use a reserved field/bit remaining in the SERVICE field to indicate that a wake-up receiver PPDU is forthcoming, as it is expected that this will not have a significant impact on the legacy operations. Additionally or alternatively, in an embodiment, the indication that the wake-up receiver PPDU is forthcoming is included in a field of the MAC header.

Figure 14:
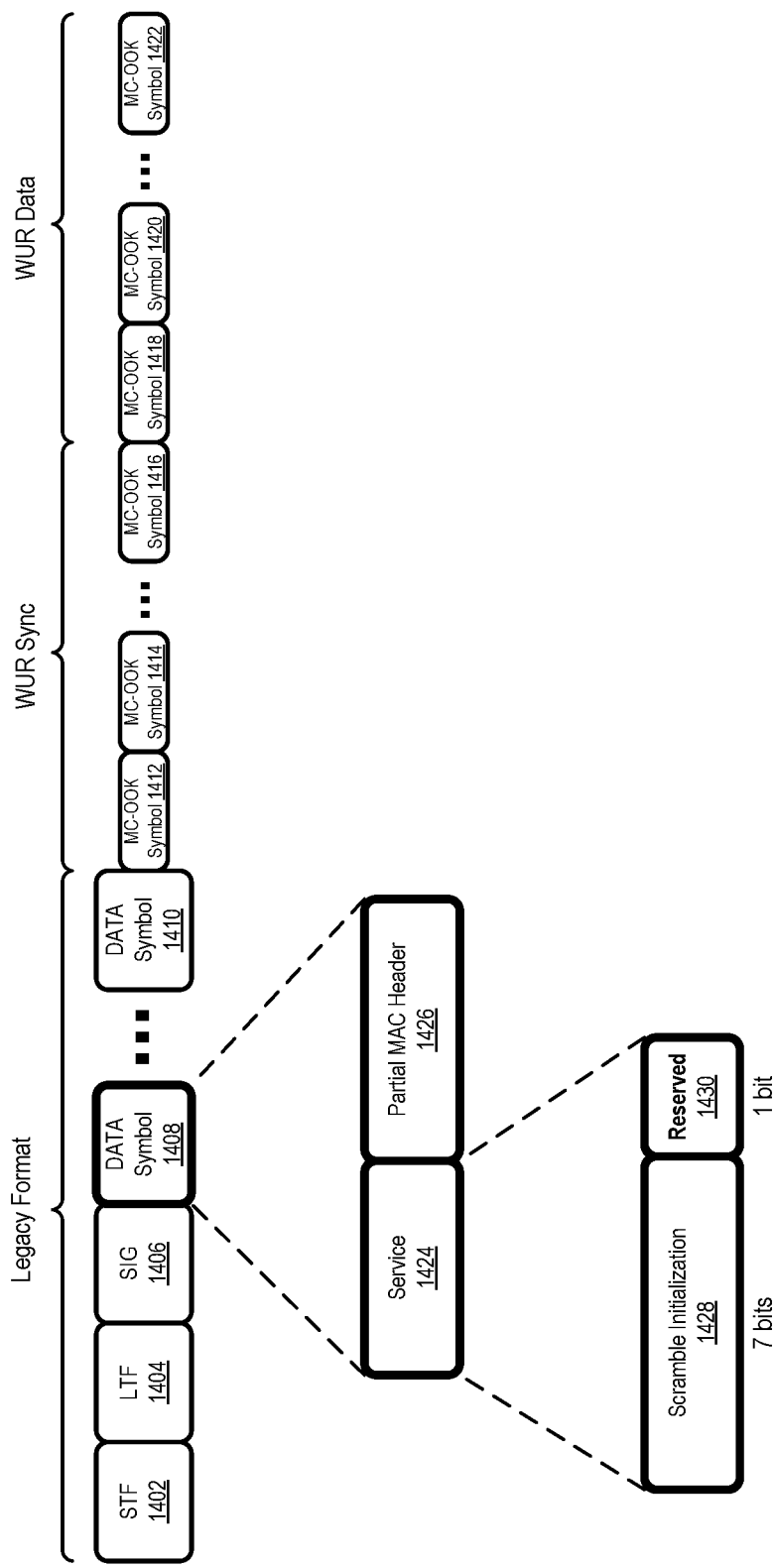
FIG. 14 is a diagram showing a format of a wake-up signal that includes a legacy format portion that can indicate wake-up signal existence, according to some embodiments.

FIG. 14 is a diagram showing a format of a wake-up signal that includes a legacy format portion that can indicate wake-up signal existence, according to some embodiments. As shown in the diagram, the wake-up signal includes legacy format portion that includes a STF field 1402, a LTF field 1404, a SIG field 1406, a data symbol 1408, and a data symbol 1410. The legacy format portion may include additional data symbols, which are not shown in the diagram. The wake-up signal further includes a WUR synchronization (sync) portion that includes MC-OOK symbol 1412, MC-OOK symbol 1414, and MC-OOK symbol 1416. The WUR sync portion may include additional MC-OOK symbols, which are not shown in the diagram. The wake-up signal further includes a WUR data portion that includes MC-OOK symbol 1418, MC-OOK symbol 1420, and MC-OOK symbol 1422. The WUR data portion may include additional MC-OOK symbols, which are not shown in the diagram.

As shown in the diagram, data symbol 1408 includes a service field 1424 and a partial MAC header 1426 (the service field is included in the first data symbol following the legacy preamble in the legacy format portion). The service field 1424 includes a scramble initialization field 1428 (7 bits) and a reserved bit 1430

In an embodiment, the reserved bit 1430 in the service field 1424 is used to indicate the existence of a wake-up signal (and thus it may be referred to as a wake-up signal existence bit). In an embodiment, a STA that identifies that the wake-up signal existence bit is set (indicating the existence of a wake-up signal) does not immediately transition its main radio to the doze state even if it identifies that an AP PM bit is set. Since the PSDU of a legacy format is a S1G Beacon frame, it is determined whether the frame is transmitted from MYBSS. If it is determined that the frame is transmitted from MYBSS, the STA waits to receive a signal of the next S1G legacy format. If it is determined that the signal does not include a frame addressed to itself, the STA may transition to the doze state. If the frame is addressed to the STA, the STA responds to the frame. By defining these additional operations, the aforementioned problems that may occur due to setting of the AP PM bit can be prevented. Further, there may be advantages when legacy STAs can recognize that an overheard signal is a wake-up signal. One advantage is that grounds for determining whether to transition to the doze can be provided when the OBSS WUR STA listens to the signal. Generally, when a wake-up signal is transmitted, a medium is occupied with the transmission of the wake-up receiver PPDU for a significantly long time. Furthermore, during a transition delay, another AP may preoccupy a channel through NAV and the like. For OBSS WUR STA to wait for such a long time may also reduce the power saving effect of the OBSS network. Thus, it is helpful to be able to identify the existence of a wake-up signal including a wake-up receiver PPDU based on only the legacy format portion.

An advantage of some embodiments descried herein is that they provide improved power-savings and channel usage efficiency of a low-power device using a wake-up receiver by using an AP power management bit and/or a wake-up signal existence bit. Embodiments are able to secure/protect the operations of a low-power wireless device by taking into consideration that there might be legacy wireless devices in the same BSS that are not capable of properly interpreting the wake-up signal.

Turning now to FIG. 15, a method 1500 will now be described for wirelessly transmitting a wake-up signal, in accordance with some embodiments. The method 1500 may be performed by one or more devices described herein. For example, the method 1500 may be performed by a wireless device 104 functioning as an AP in a wireless network.

Although shown in a particular order, in some embodiments the operations of the method 1500 (and the other methods shown in the other figures) may be performed in a different order. For example, although the operations of the method 1500 are shown in a sequential order, some of the operations may be performed in partially or entirely overlapping time periods.

As shown in FIG. 15, the method 1500 may commence at operation 1502 with the wireless device wirelessly transmitting a legacy PPDU to protect a wake-up receiver PPDU, wherein the legacy PPDU includes a preamble and a legacy frame, wherein the legacy frame includes a power management field that indicates that the wireless device is transitioning to a doze state to cause other wireless devices to refrain from transmitting to the wireless device. In an embodiment, the legacy frame is a S1G beacon frame. In an embodiment, the power management field includes a single bit, wherein the single bit is set to binary '1' to indicate that that the wireless device is transitioning to the doze state.

In an embodiment, operation at operation 1504, the wireless device wirelessly transmits a service field after transmitting the preamble but before transmitting the legacy frame, wherein the service field indicates that transmission of the wake-up receiver PPDU is forthcoming. In an embodiment, a last bit of the service field is used to indicate that the transmission of the wake-up receiver PPDU is forthcoming.

At operation 1506, the wireless device wirelessly transmits the wake-up receiver PPDU after transmitting the legacy PPDU.

In an embodiment, at operation 1508, the wireless device wirelessly transmits a data frame after a transition delay has elapsed since the wake-up receiver PPDU was transmitted (e.g., to give time for the recipient to wake up its main radio), wherein the data frame includes a power management field that indicates that the wireless device has transitioned to an awake state to allow the other wireless devices to transmit to the wireless device.

Figure 16:
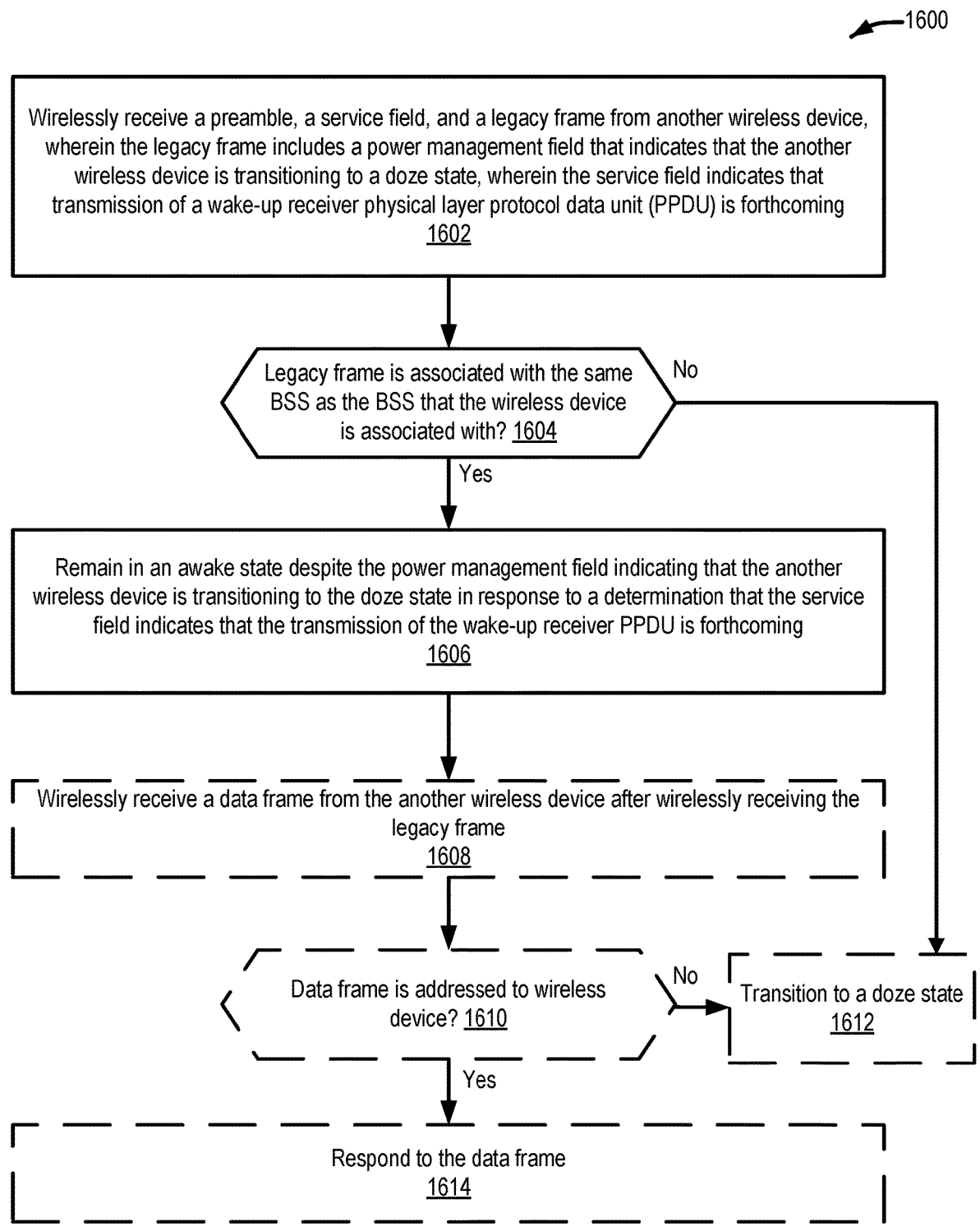
FIG. 16 is a diagram showing a method for wirelessly receiving and processing a wake-up signal, according to some embodiments.

Turning now to FIG. 16, a method 1600 will now be described for wirelessly receiving and processing a wake-up signal, in accordance with some embodiments. The method 1600 may be performed by one or more devices described herein. For example, the method 1600 may be performed by a wireless device 104 functioning as a non-AP STA in a wireless network.

As shown in FIG. 16, the method 1600 may commence at operation 1602 with the wireless device wirelessly receiving a preamble, a service field, and a legacy frame from another wireless device, wherein the legacy frame includes a power management field that indicates that the another wireless device is transitioning to a doze state, wherein the service field indicates that transmission of a wake-up receiver PPDU is forthcoming.

At operation 1604, the wireless device determines whether the legacy frame is associated with the same BSS as the BSS that the wireless device is associated with. If so, the method proceeds to operation 1606. Otherwise, the method proceeds to operation 1612, where the wireless device transitions to a doze state.

At operation 1606, the wireless device remains in an awake state despite the power management field indicating that the another wireless device is transitioning to the doze state in response to a determination that the service field indicates that the transmission of the wake-up receiver PPDU is forthcoming.

In an embodiment, at operation 1608, the wireless device wirelessly receives a data frame from the another wireless device after wirelessly receiving the legacy frame.

In an embodiment, at operation 1610, the wireless device determines whether the data frame is addressed to the wireless device (to itself). If so, the method proceeds to operation 1614, where the wireless device responds to the data frame. Otherwise, the method proceeds to operation 1612, where the wireless device transitions to the doze state.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device, comprising:
wirelessly transmitting a legacy physical layer protocol data unit (PPDU) to protect a wake-up receiver PPDU, wherein the legacy PPDU includes a preamble, a service field, and a legacy frame, wherein the legacy frame includes a power management field that indicates that the wireless device is transitioning to a doze state to cause other wireless devices to refrain from transmitting to the wireless device, wherein the service field or a field in a media access control (MAC) header of the legacy frame indicates, to a non-legacy wireless device receiving the legacy PPDU, that a wake-up receiver PPDU is forthcoming, wherein the service field or the field in the MAC header enables the non-legacy wireless device to remain awake despite the power management field indicating that the wireless device is transitioning to the doze state when the legacy frame is associated with a same basic service set (BSS) as a BSS that the non-legacy wireless device is associated with; and
wirelessly transmitting a wake-up receiver PPDU after transmitting the legacy PPDU.

2. The method of claim 1, further comprising:
wirelessly transmitting a data frame after a transition delay has elapsed since the wake-up receiver PPDU was transmitted, wherein the data frame includes a power management field that indicates that the wireless device has transitioned to an awake state to allow the other wireless devices to transmit to the wireless device.

3. The method of claim 1,
wherein the service field is transmitted between the preamble and the legacy frame.

4. The method of claim 3, wherein a last bit of the service field is used to indicate that the wake-up receiver PPDU is forthcoming.

5. The method of claim 1, wherein the legacy frame is a S1G beacon frame.

6. The method of claim 1, wherein the power management field includes a single bit, wherein the single bit is set to binary '1' to indicate that that the wireless device is transitioning to the doze state.

7. A method performed by a wireless device, comprising:
wirelessly receiving a preamble, a service field, and a legacy frame from another wireless device, wherein the legacy frame includes a power management field that indicates that the another wireless device is transitioning to a doze state, wherein the service field or a field included in a media access control (MAC) header of the legacy frame indicates that transmission of a wake-up receiver physical layer protocol data unit (PPDU) is forthcoming;
determining whether the legacy frame is associated with a same basic service set (BSS) as a BSS that the wireless device is associated with; and
remaining in an awake state despite the power management field indicating that the another wireless device is transitioning to the doze state in response to a determination that the service field or the field included in the MAC header indicates that the transmission of the wake-up receiver PPDU is forthcoming and the legacy frame is associated with the same BSS as the BSS that the wireless device is associated with.

8. The method of claim 7, further comprising:
wirelessly receiving a data frame from the another wireless device after wirelessly receiving the legacy frame.

9. The method of claim 8, further comprising:
transitioning to a doze state in response to a determination that the data frame is not addressed to the wireless device.

10. The method of claim 8, further comprising:
responding to the data frame in response to a determination that the data frame is addressed to the wireless device.

11. A wireless device that is to operate in a wireless network, the wireless device comprising:
a radio frequency transceiver;
a memory device storing a set of instructions; and
a processor coupled to the memory device, wherein the set of instructions when executed by the processor causes the wireless device to:
wirelessly transmit a legacy physical layer protocol data unit (PPDU) to protect a wake-up receiver PPDU, wherein the legacy PPDU includes a preamble, a service field, and a legacy frame, wherein the legacy frame includes a power management field that indicates that the wireless device is transitioning to a doze state to cause other wireless devices to refrain from transmitting to the wireless device, wherein the service field or a field in a media access control (MAC) header of the legacy frame indicates, to a non-legacy wireless device receiving the legacy PPDU, that a wake-up receiver PPDU is forthcoming, wherein the service field or the field in the MAC header enables the non-legacy wireless device to remain awake despite the power management field indicating that the wireless device is transitioning to the doze state when the legacy frame is associated with a same basic service set (BSS) as a BSS that the non-legacy wireless device is associated with and
wirelessly transmit a wake-up receiver PPDU after transmitting the legacy PPDU.

12. The wireless device of claim 11, wherein the set of instructions when executed by the processor further causes the wireless device to:
wirelessly transmit a data frame after a transition delay has elapsed since the wake-up receiver PPDU was transmitted, wherein the data frame includes a power management field that indicates that the wireless device has transitioned to an awake state to allow the other wireless devices to transmit to the wireless device.

13. The wireless device of claim 11,
wherein the service field is transmitted between the preamble and the legacy frame.

14. The wireless device of claim 13, wherein a last bit of the service field is used to indicate that the wake-up receiver PPDU is forthcoming.

15. The wireless device of claim 11, wherein the legacy frame is a S1G beacon frame.

16. The wireless device of claim 11, wherein the power management field includes a single bit, wherein the single bit is set to binary '1' to indicate that that the wireless device is transitioning to the doze state.

17. A wireless device that is to operate in a wireless network, the wireless device comprising:
a radio frequency transceiver;
a memory device storing a set of instructions; and
a processor coupled to the memory device, wherein the set of instructions when executed by the processor causes the wireless device to:
wirelessly receive a preamble, a service field, and a legacy frame from another wireless device, wherein the legacy frame includes a power management field that indicates that the another wireless device is transitioning to a doze state, wherein the service field or a field included in a media access control (MAC) header of the legacy frame indicates that transmission of a wake-up receiver physical layer protocol data unit (PPDU) is forthcoming,
determine whether the legacy frame is associated with a same basic service set (BSS) as a BSS that the wireless device is associated with, and
remain in an awake state despite the power management field indicating that the another wireless device is transitioning to the doze state in response to a determination that the service field or the field included in the MAC header indicates that the transmission of the wake-up receiver PPDU is forthcoming and the legacy frame is associated with the same BSS as the BSS that the wireless device is associated with.

18. The wireless device of claim 17, wherein the set of instructions when executed by the processor further causes the wireless device to:
wirelessly receive a data frame from the another wireless device after wirelessly receiving the legacy frame.

19. The wireless device of claim 18, wherein the set of instructions when executed by the processor further causes the wireless device to:
transition to a doze state in response to a determination that the data frame is not addressed to the wireless device.

20. The wireless device of claim 18, wherein the set of instructions when executed by the processor further causes the wireless device to:
respond to the data frame in response to a determination that the data frame is addressed to the wireless device.

* * * * *